March 9, 1965   M. H. GROVE   3,172,193
METHOD FOR THE MANUFACTURE OF VALVE BODIES
Filed Aug. 16, 1961   2 Sheets-Sheet 1
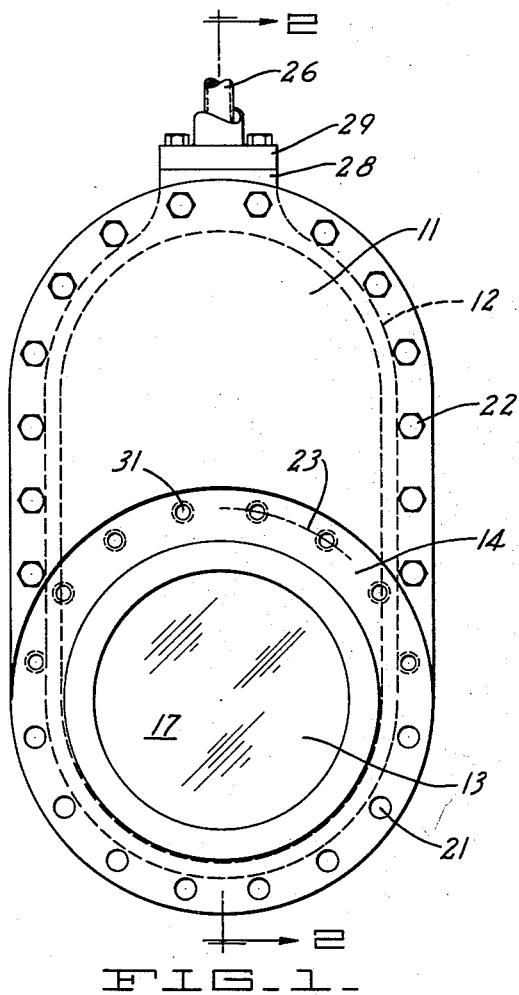
FIG_1_
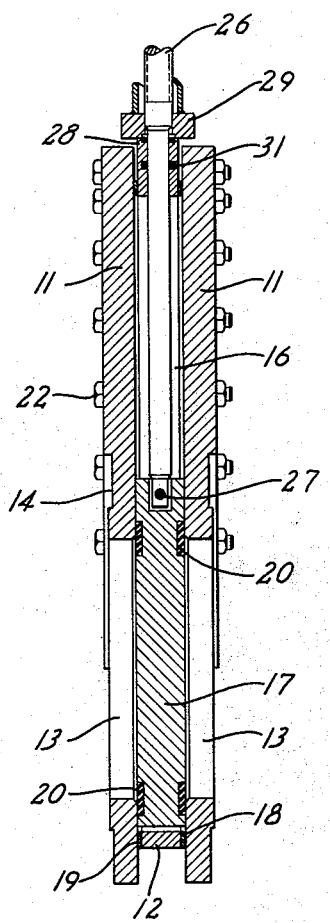
FIG_2_
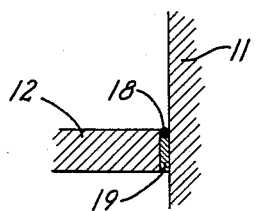
FIG_3_
INVENTOR.
Marvin H. Grove.
BY
*Flehr and Swain*
ATTORNEYS.

March 9, 1965    M. H. GROVE    3,172,193
METHOD FOR THE MANUFACTURE OF VALVE BODIES
Filed Aug. 16, 1961    2 Sheets-Sheet 2
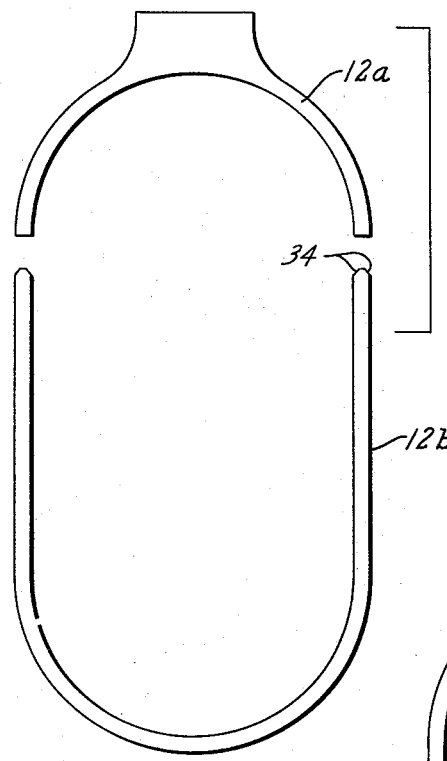
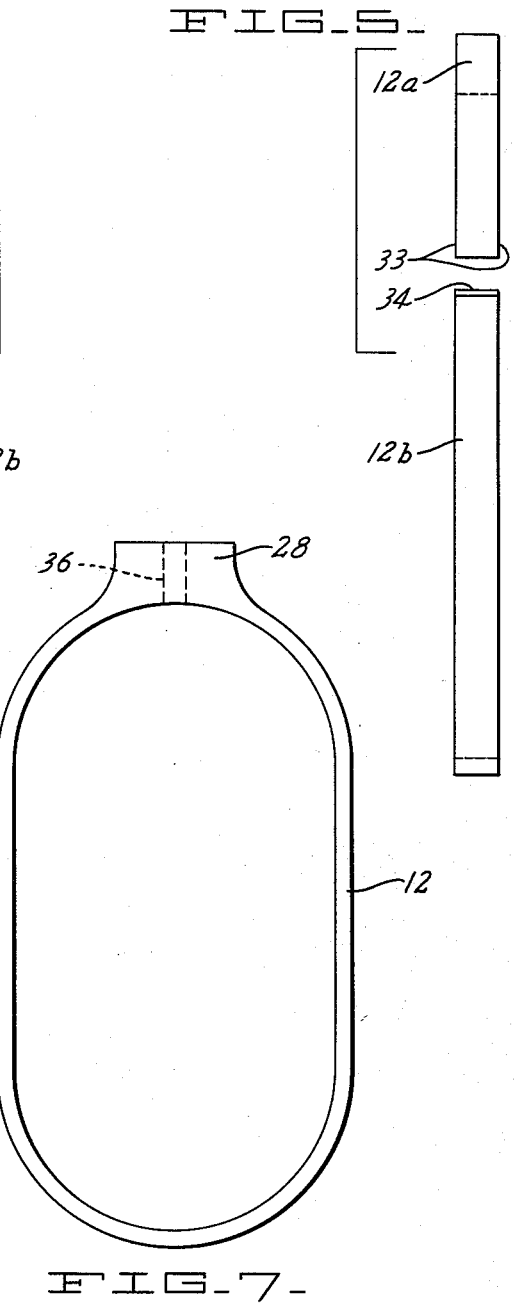
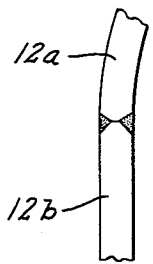
INVENTOR.
Marvin H. Grove.
BY
ATTORNEYS.

United States Patent Office 3,172,193
Patented Mar. 9, 1965

3,172,193
METHOD FOR THE MANUFACTURE OF VALVE BODIES
Marvin H. Grove, 340 Hillside Ave., Piedmont, Calif.
Filed Aug. 16, 1961, Ser. No. 131,803
2 Claims. (Cl. 29—157.1)

This invention relates generally to methods for the manufacture of valve bodies for valves of the gate type.

In the past gate valve bodies have been fabricated or assembled from steel plate or other structural steel members, as distinguished from the more conventional castings. One simple form of assembled valve body consists of plate-like side members which are bolted at their margins upon an intermediate body part. (See Leach et al. 1,780,160.) The intermediate body part may be in the form of an oval-shaped band, which at one end carries a bonnet block, and which is dimensioned to form an inner space to accommodate the valve gate. The construction of the intermediate body part presents a manufacturing problem, because it should be made economically but with reasonable accuracy.

In general it is an object of the present invention to provide a novel method for the manufacture of an assembled or fabricated gate valve body.

Another object of the invention is to provide a method of the above character which utilizes simple machining and mechanical operations, to produce an oval-shaped body part that is relatively accurate.

Additional objects and features of the invention will appear from the following description in which the preferred embodiments are set forth in detail in conjunction with the accompanying drawing.

Referring to the drawing:

FIGURE 1 is an end view illustrating a valve incorporating an assembled body.

FIGURE 2 is a cross sectional view taken along the line 2—2 of FIGURE 1.

FIGURE 3 is a cross sectional detail illustrating suitable means between the body parts.

FIGURE 4 is an exploded view illustrating the two parts used in my method for constructing the intermediate body part.

FIGURE 5 is an exploded view looking towards one side of FIGURE 4.

FIGURE 6 is a detail illustrating one of the weld connections.

FIGURE 7 is a view in elevation showing the completed body part.

The valves illustrated in FIGURES 1 and 2 consist of rigid side plates 11, which may be duplicates, together with an intermediate body part 12. The side body parts 11 can be formed of flat mill-rolled steel or suitable metal or metal alloy, with a generally oval configuration as shown in FIGURE 1. Aligned openings 13 are shown formed in the side body parts and form flow passages for making connection with associated piping. Depending upon the line pressures for which the valve is designed, various means can be used (i.e. ribs, etc., not shown) in conjunction with the side plates 11, to prevent outward deflection. Assuming that pipe flanges are to be coupled to the side plates, the outer faces of the side body parts surrounding the openings 13 can be suitably machined as indicated at 14. The inner body space 16 serves to accommodate the valve gate 17. This gate is shown in the form of a plate or slab with flat parallel side faces, and likewise can be formed of flat mill-rolled steel or suitable metal or metal alloy.

The intermediate body part 12 is in the form of an oval band. Suitable sealing means can be provided between the body parts. As shown in FIGURE 3, the sealing means consists of seal rings 18 of the resilient O-ring type, which engage the inner edges of the metal retainer gaskets 19. Normally these gaskets are tightly clamped between the end faces of the intermediate body part and the adjacent faces of the side body members 11.

Suitable gate sealing means is provided for sealing against line pressure when the valve is closed. Thus seal rings 20 of resilient material (e.g. Teflon, nylon, or rubber, etc.) can be mounted on the gate.

Suitable means is provided for clamping the body parts together. In the embodiment illustrated the margins of the side members 11 are provided with spaced openings 21, which accommodate the clamping bolts 22.

In FIGURE 1 it is assumed that the associated pipe coupling flanges have the bolt circles 23. For one-half of each bolt circle the threaded openings 31 are provided, which are adapted to receive clamping studs. For the other half, bolts are extended through the openings 21, and are of sufficient length to extend through the associated pipe coupling flanges.

Any suitable valve operating means can be employed, such as a hand wheel, motor operator, etc. The valve operating stem 26 has its inner end attached to one edge of the gate 17, as by means of pin 27.

A bonnet block 28 forms a part of the intermediate body, and is bored to accommodate the valve stem. A bonnet plate 29 is secured to the block 28, and serves to support exterior operating means. Suitable sealing means, such as the seal ring 31 of the resilient O-ring type, prevents leakage past the stem.

In accordance with my method the intermediate body part 12 is constructed as follows: A head part 12a is first constructed substantially in the form shown in FIGURES 4 and 5. This part can be made as a steel casting, or a forging, or it can be made by torch cutting from steel plate. It should be relatively rigid and capable of withstanding machining operations without warping. The side surfaces 33 of this part are now machined, as by grinding, substantially to final dimensions and finish.

The second body part 12b can be formed as a steel casting, a forging, by torch cutting from steel plate, or by bending a length of bar stock. Preferably it is formed by bending a steel bar of suitable dimensions to U-shaped configuration, with the ends being beveled as indicated at 34, to facilitate subsequent welding. The thickness of the bar forming the parts 12b normally is slightly greater than the thickness of the machined part 12a.

The two parts 12a and 12b are welded together in the manner shown in FIGURE 6. Because of the rigidity of part 12a, and because the welds are applied to substantially straight side sections, these welding operations can be carried out without causing any substantial warpage or distortion of the assembly, and without damaging the major area of the machined surfaces 33.

After the two parts have been welded together, the end faces are further finished as by grinding or like machining, until the end surfaces of the part 12b are co-planar with the surfaces 33. In carrying out this machining operation, the surfaces 33 are used for reference, and this part can be affixed to a suitable referenced surface, such as may be provided by a jig, fixture, etc.

The complete machined body part is shown in FIGURE 7. At this time, or at some earlier stage in the manufacturing procedure, the hole 36 may be bored in the block 28 for accommodating the valve operating stem.

It will be evident that the exact configurations of the parts 12a and 12b may vary. Where the operating means is of the internal type and a bonnet is not required, the block 28 can be omitted and part 12a made as a simple arcuate member.

The extent of final machining depends somewhat upon the welding technique employed. With the more recently developed techniques, such as so called "dip transfer welding," part 12b can be finished to about final size before welding. In such event final grinding serves mainly to remove any excess weld metal.

In general the method described above makes it possible economically to manufacture the intermediate body part with simple machining and welding operations, and with relatively simple tools and fixtures.

I claim:

1. In a method for the manufacture of a valve body of the type having an intermediate body part together with separate side flat plate-like body parts clamped upon opposite sides of said intermediate body part, the steps of forming said intermediate part by first forming a generally U-shaped metal part, then welding the extremities of the U-shaped part to a head part, and thereafter machining the side faces of the resulting structure whereby such faces are made flat and parallel to receive said flat plate-like body parts.

2. In a method for the manufacture of a valve body of the type having an intermediate body part together with separate side flat plate-like parts clamped upon opposite sides of said intermediate body part, the intermediate body part being generally oval in configuration and having flat parallel side faces, the steps of forming said intermediate body part comprising forming two body parts, one part being rigid with spaced side extremities, the other body part being U-shaped in configuration with its extremities spaced apart a distance substantially the same as the extremities of the first body part, welding the extremities of the two body parts together, and thereafter machining the side surfaces of the resulting body whereby said surfaces are made flat and parallel to receive said flat plate-like body parts.

References Cited by the Examiner

UNITED STATES PATENTS

| 1,340,032 | 5/20 | Fleming | 29—401 XR |
| 2,395,348 | 2/46 | Sherman. | |
| 2,841,864 | 7/58 | Kelly | 29—481 XR |
| 2,891,762 | 6/59 | Kellogg | 251—329 XR |
| 3,002,525 | 10/61 | Grove | 251—329 XR |
| 3,047,266 | 7/62 | Ver Nooy | 251—329 XR |

FOREIGN PATENTS 471,417    9/37    Great Britain.

WHITMORE A. WILTZ, *Primary Examiner.*

HYLAND BIZOT, *Examiner.*